(12) United States Patent
Han et al.

(10) Patent No.: US 10,718,446 B2
(45) Date of Patent: Jul. 21, 2020

(54) VALVE WITH SELF-LOCKING FUNCTION

(71) Applicant: Jiangsu Suyan Valve Machinery Co., Ltd, Jiangsu Province (CN)

(72) Inventors: Zhenghai Han, Jiangsu Province (CN); Wenhao Han, Jiangsu Province (CN); Wenwen Han, Jiangsu Province (CN); Yu Han, Jiangsu Province (CN); Sheng Han, Jiangsu Province (CN)

(73) Assignee: Jiangsu Suyan Valve Machinery Co., Ltd., Jiangsu Province (CN)

( * ) Notice: Subject to any disclaimer, the term of this patent is extended or adjusted under 35 U.S.C. 154(b) by 90 days.

(21) Appl. No.: 16/034,221

(22) Filed: Jul. 12, 2018

(65) Prior Publication Data
US 2019/0383420 A1 Dec. 19, 2019

(30) Foreign Application Priority Data
Jun. 19, 2018 (CN) .......................... 2018 1 0630802

(51) Int. Cl.
| | |
|---|---|
| *F16K 3/02* | (2006.01) |
| *F16K 35/02* | (2006.01) |
| *F16K 35/10* | (2006.01) |
| *F16H 31/00* | (2006.01) |
| *F16K 31/50* | (2006.01) |
| *F16K 31/524* | (2006.01) |
| *F16K 31/53* | (2006.01) |

(52) U.S. Cl.
CPC ............ *F16K 35/025* (2013.01); *F16K 35/02* (2013.01); *F16K 35/022* (2013.01); *F16K 35/027* (2013.01); *F16K 35/10* (2013.01); *F16H 31/004* (2013.01); *F16K 3/0281* (2013.01); *F16K 31/508* (2013.01); *F16K 31/52408* (2013.01); *F16K 31/53* (2013.01)

(58) Field of Classification Search
CPC ...... F16K 35/02; F16K 35/022; F16K 35/025; F16K 35/027; F16K 35/10; F16K 3/0281; F16K 31/52408; F16K 31/53; F16K 31/508; F16H 31/004
USPC .......... 251/89–116, 120, 230, 249, 266, 267, 251/284, 326, 327; 74/111–169
See application file for complete search history.

(56) References Cited

U.S. PATENT DOCUMENTS

| | | | | |
|---|---|---|---|---|
| 19,108 | A | * | 1/1858 | Tom ........................ F16N 13/12 184/71 |
| 286,596 | A | * | 10/1883 | Ercanbrack ............. F16H 29/02 74/120 |
| 654,009 | A | * | 7/1900 | Kittinger .................. F16K 17/00 137/465 |
| 1,730,305 | A | * | 10/1929 | Stancu, Jr. ................ F16K 1/50 251/116 |

(Continued)

*Primary Examiner* — Matthew W Jellett
(74) *Attorney, Agent, or Firm* — Schmeiser, Olsen & Watts LLP

(57) ABSTRACT

The invention relates to a valve, in particular to a valve with self-locking function which comprises a valve body, a valve element, a valve control assembly, an upper locking assembly and a lower locking assembly; the valve body comprises an upper box body, a lower box body, a water inlet pipe and a water outlet pipe; the lower end of the upper box body is fixedly connected and communicated with the lower box body, the left end of the lower box body is fixedly connected with the water inlet pipe, and the right end of the lower box body is fixedly connected with the water outlet pipe.

5 Claims, 6 Drawing Sheets

(56) References Cited

U.S. PATENT DOCUMENTS

| | | | | |
|---|---|---|---|---|
| 3,763,880 | A * | 10/1973 | Leopold, Jr. | F16K 3/28 137/316 |
| 4,013,090 | A * | 3/1977 | Taylor | F16K 3/02 137/329.05 |
| 4,231,389 | A * | 11/1980 | Still | F16K 31/54 137/315.29 |
| 4,235,258 | A * | 11/1980 | Uno | F16K 37/0008 137/556 |
| 4,569,503 | A * | 2/1986 | Karr, Jr. | F16K 31/1221 137/556.3 |
| 6,401,747 | B1 * | 6/2002 | Cain | F16K 3/0254 137/329.03 |
| 6,766,820 | B1 * | 7/2004 | Hoss | F23N 5/105 137/66 |
| 9,518,675 | B2 * | 12/2016 | Cook | F16K 37/0008 |
| 9,845,900 | B2 * | 12/2017 | Cheney | F16K 47/02 |
| 10,060,548 | B1 * | 8/2018 | Oak | F16K 31/504 |

* cited by examiner

VALVE WITH SELF-LOCKING FUNCTION

CROSS REFERENCE TO RELATED APPLICATION

This application claims priority from Chinese Patent Application No. 201810630802.9, filed Jun. 19, 2018 and entitled "VALVE WITH SELF-LOCKING FUNCTION" the disclosure of which is hereby incorporated entirely herein by reference.

FIELD OF THE INVENTION

The invention relates to the technical field of valves, in particular to a valve with the self-locking function.

BACKGROUND OF THE INVENTION

In industrial production, a valve needs to be used in many places, a handle which can be opened or closed by a manual operation valve needs to be arranged on the valve. In the valve use process, the valve can be operated by mistake, the handle is prevented from rotating due to external force collision and other reasons, and then the valve is mistakenly opened (or closed); once the condition occurs, it leads to the waste of the resources (the medium in the pipeline flows out through the valve), or the normal operation of the system is influenced (the valve is closed incorrectly and the medium cannot be supplied through a valve), seriously, casualties can be caused (poisonous-acting medium flows out of valve). The valve in the prior art does not have a self-locking function when being used, due to the fact that the valve is prone to being mistakenly operated, false opening or false closing can be caused.

SUMMARY OF THE INVENTION

The invention aims to provide a valve with a self-locking function and can effectively solve the problem in the prior art. The inner part of the invention is provided with a valve control assembly, which is used to control the position of the valve element, so that the valve body is in an opened or closed state. The inner part of the invention is provided with an upper locking assembly, when the valve control assembly drives the valve element to move upwards, the valve body is in an open state, the upper locking assembly is used for synchronously jacking and locking the valve element which can prevent maloperation closing of workers; The inner part of the invention is provided with a lower locking assembly, when the valve control assembly drives the valve element to move downwards, the valve body is in a closed state, the lower locking assembly is used for synchronously jacking and locking the valve element which can prevent maloperation opening of workers.

The purpose of the invention is realized by the following technical scheme:

The valve with self-locking function which comprises a valve body, a valve element, a valve control assembly, an upper locking assembly and a lower locking assembly; the valve body comprises an upper box body, a lower box body, a water inlet pipe and a water outlet pipe; the lower end of the upper box body is fixedly connected and communicated with the lower box body, the left end of the lower box body is fixedly connected with the water inlet pipe, and the right end of the lower box body is fixedly connected with the water outlet pipe.

The valve element is connected to the inner side of the upper box body and the inner side of the lower box body in a clearance fit mode; the valve element is connected to the lower end of the valve control assembly through threads; the valve control assembly is connected to the top surface of the upper box body in a rotating fit mode; the upper end of the upper locking assembly is fixedly connected to the top surface of the upper box body, and the valve control assembly is in transmission connection with the upper locking assembly; the upper locking assembly is connected to the right side of the upper box body in a sliding fit mode; the lower locking assembly is fixedly connected to the lower box body and the lower locking assembly is communicated with the lower box body.

The valve element is a rectangular core body; an inner threaded through hole is formed in the middle of the valve element, upper positioning inserting groove is formed in the upper end of the right side face of the valve element, lower positioning inserting groove is formed in the lower end of the right side face of the valve element.

The valve control assembly comprises a screwing rod, an upper short shaft, a worm, a lower short shaft and an external thread control rod; the screwing rod, the upper short shaft, the worm, the lower short shaft and the external thread control rod are sequentially and fixedly connected from top to bottom; the worm is in transmission connection with an upper locking assembly and a lower short shaft is rotationally connected to the top surface of the upper box body through a belt seat bearing; the outer thread control rod is rotationally matched with the inner side of the upper box body and the inner side of the lower box body, and the outer thread control rod is rotationally connected to the bottom surface of the lower box body through a belt seat bearing; the outer thread control rod is in threaded connection with the inner threaded through hole of the valve element.

The upper locking assembly comprises a worm wheel, a wheel shaft and a shaft frame plate, a one-way transmission wheel, a short column, a clamping jaw, a rack, a sliding chute frame, a T-shaped sliding block, an L-shaped push rod and an upper locking top block; the worm wheel is in threaded connection with a worm, a worm wheel is fixedly connected to a wheel shaft, a wheel shaft is rotationally connected to the shaft frame plate through a belt seat bearing; the shaft frame plate is fixedly connected to the top surface of the upper box body, the front end of the wheel shaft is fixedly connected with a one-way transmission wheel, and a plurality of arc-shaped grooves are formed in the one-way transmission wheel, the rear end of the inner side of the arc-shaped groove is rotationally matched with a short column, the short column is fixedly connected with a clamping jaw, the lower end of the clamping jaw is connected to the rack in a meshed mode, the rack is fixedly connected to sliding chute frame, side sliding chute is formed in the side face of the sliding chute frame, lower sliding chute is formed in bottom surface of sliding chute frame, lower sliding chute communicated with side sliding chute; upper end of the T-shaped sliding block is slidably connected to the inner sides of the lower sliding groove and the two side sliding grooves, the lower end of the T-shaped sliding block is fixedly connected to the top surface of the upper box body, vertical rod of L-shaped push rod fixedly connected with the right end of sliding chute frame, cross rod of the L-shaped push rod is connected to the right side face of the upper box body in a sliding fit mode, upper locking top block is fixedly connected to the left end of L-shaped push rod, the upper locking top block is arranged on the inner side of the upper box body.

The upper locking top block is in clearance fit with the inner side of the upper positioning insertion groove.

The lower locking assembly comprises a lower locking top block, a L-shaped push-pull rod, a spring rod and an extension spring, a limiting ring, an L-shaped seat plate and a left side hollow sliding box; the left end of the sliding box is fixedly connected to the lower end of the right side surface of the lower box body, the sliding box communicated with the lower box body, the lower locking top block is slidably fitted in the sliding box, the right end of the lower locking top block is fixedly connected with a L-shaped push-pull rod, cross rod of the L-shaped push-pull rod is connected to the sliding box in a sliding fit mode, vertical rod of L-shaped push-pull rod is arranged at the right end of sliding box, the L-shaped seat plate is fixedly connected to the right end of the sliding box, the left end of the spring rod is in sliding fit connection with a vertical rod of an L-shaped push-pull rod, the right end of the spring rod is fixedly connected to the L-shaped seat plate, the spring rod is sleeved with the extension spring, and the left end and the right end of the extension spring are fixedly connected to the L-shaped push-pull rod and the L-shaped seat plate respectively, the left end of the spring rod is connected with a limiting ring through threads, the right side surface of the limiting ring is attached to the left side surface of the vertical rod of the L-shaped push-pull rod.

The lower locking top block is in clearance fit with the inner side of the lower positioning insertion groove.

The beneficial effects of the invention are as follows: The invention aims to provide a valve with a self-locking function and can effectively solve the problem in the prior art. The inner part of the invention is provided with a valve control assembly, which is used to control the position of the valve element, so that the valve body is in an opened or closed state. The inner part of the invention is provided with an upper locking assembly, when the valve control assembly drives the valve element to move upwards, the valve body is in an open state, the upper locking assembly is used for synchronously jacking and locking the valve element which can prevent maloperation closing of workers; The inner part of the invention is provided with a lower locking assembly, when the valve control assembly drives the valve element to move downwards, the valve body is in a closed state, the lower locking assembly is used for synchronously jacking and locking the valve element which can prevent maloperation opening of workers.

Figure 1:
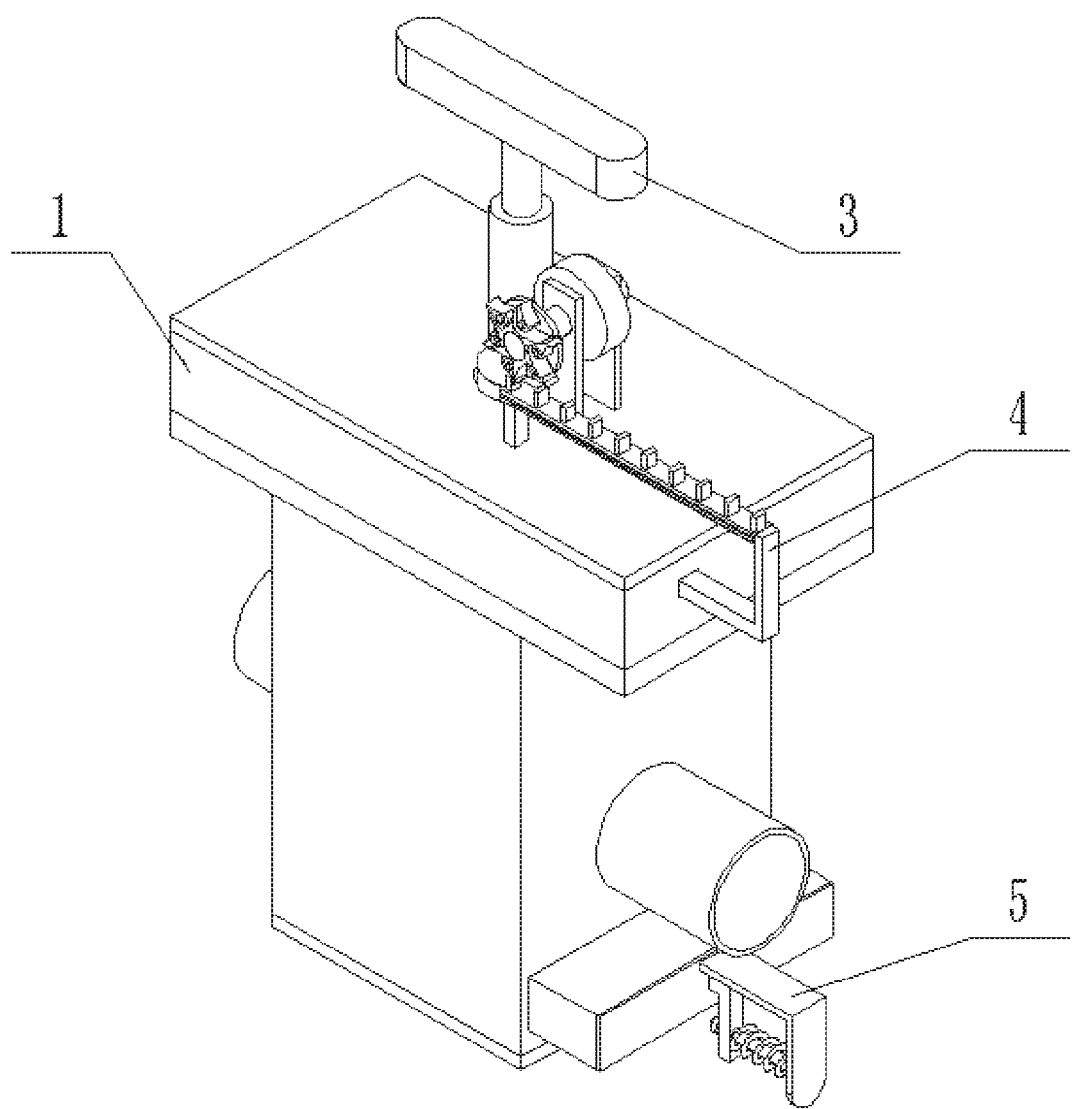
FIG. 1 is a schematic structural diagram of an integral structure of the present invention.

In Figures: valve body (1), upper box body (1-1), lower box body (1-2), water inlet pipe (1-3), water outlet pipe (1-4); valve element (2), inner threaded through hole (2-1), upper positioning inserting groove (2-2), lower positioning inserting groove (2-3); valve control assembly (3), screwing rod (3-1), upper short shaft (3-2), worm (3-3), lower short shaft (3-4), external thread control rod (3-5); upper locking assembly (4), worm wheel (4-1), wheel shaft (4-2), shaft frame plate (4-3), one-way transmission wheel (4-4), short column (4-5), clamping jaw (4-6), rack (4-7), sliding chute frame (4-8), T-shaped sliding block (4-9), L-shaped push rod (4-10), upper locking top block (4-11); lower locking assembly (5), lower locking top block (5-1), L-shaped push-pull rod (5-2), spring rod (5-3), extension spring (5-4), limiting ring (5-5), L-shaped seat plate (5-6), left side hollow sliding box (5-7).

DETAILED DESCRIPTION OF THE INVENTION

Figure 2:
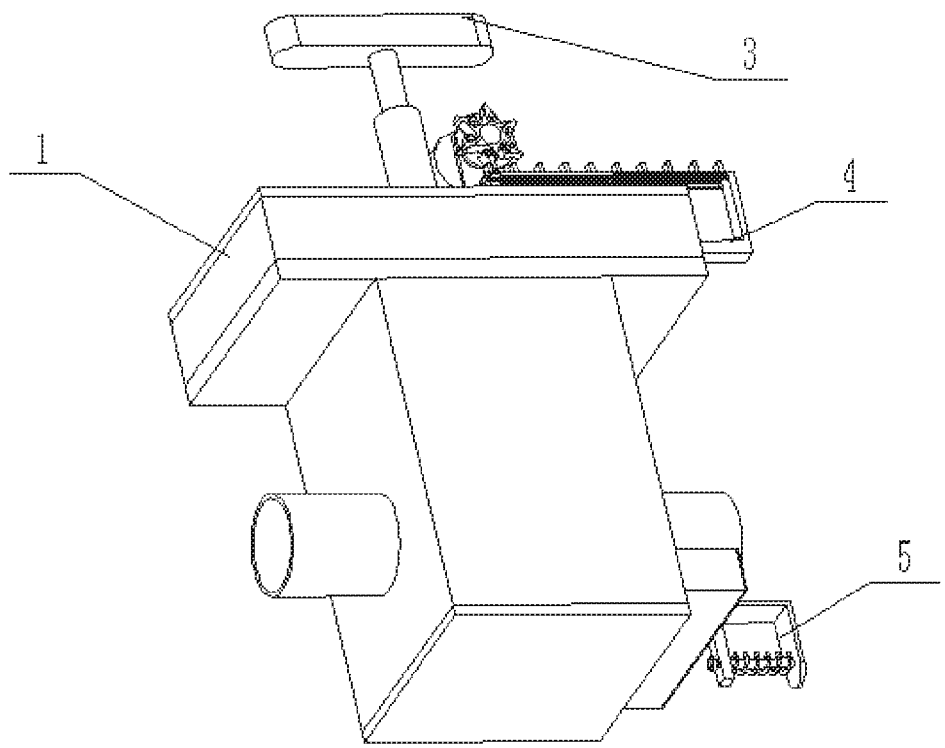
FIG. 2 is a schematic structural diagram of the integral structure of the present invention.
Figure 3:
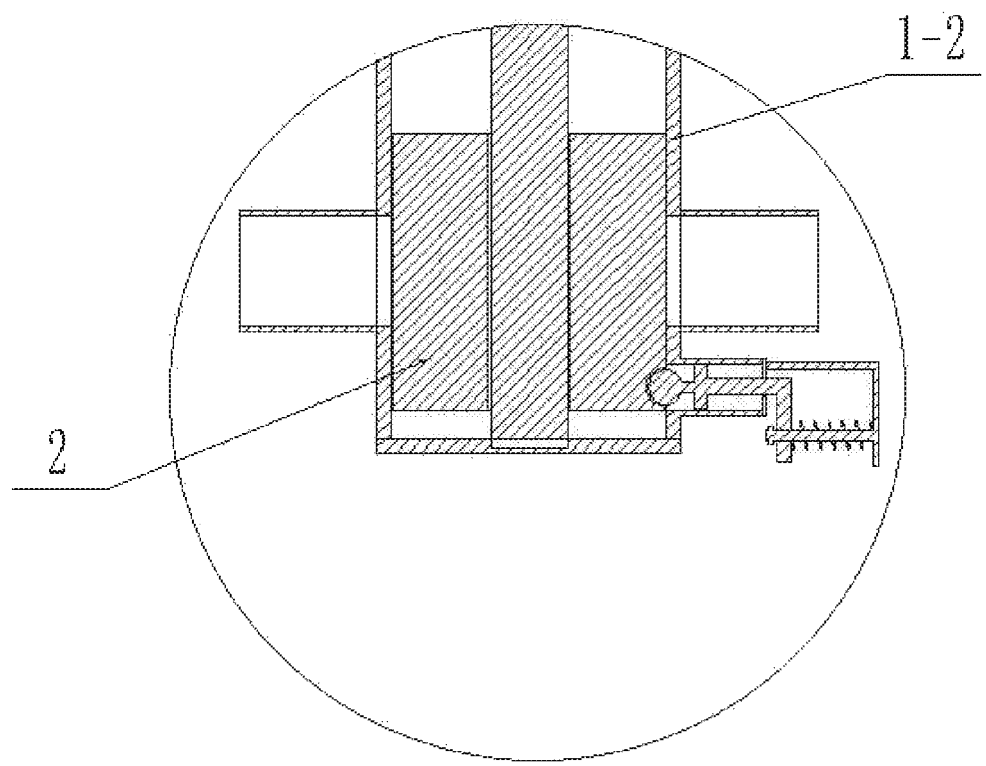
FIG. 3 is a partial sectional view of the present invention.
Figure 4:
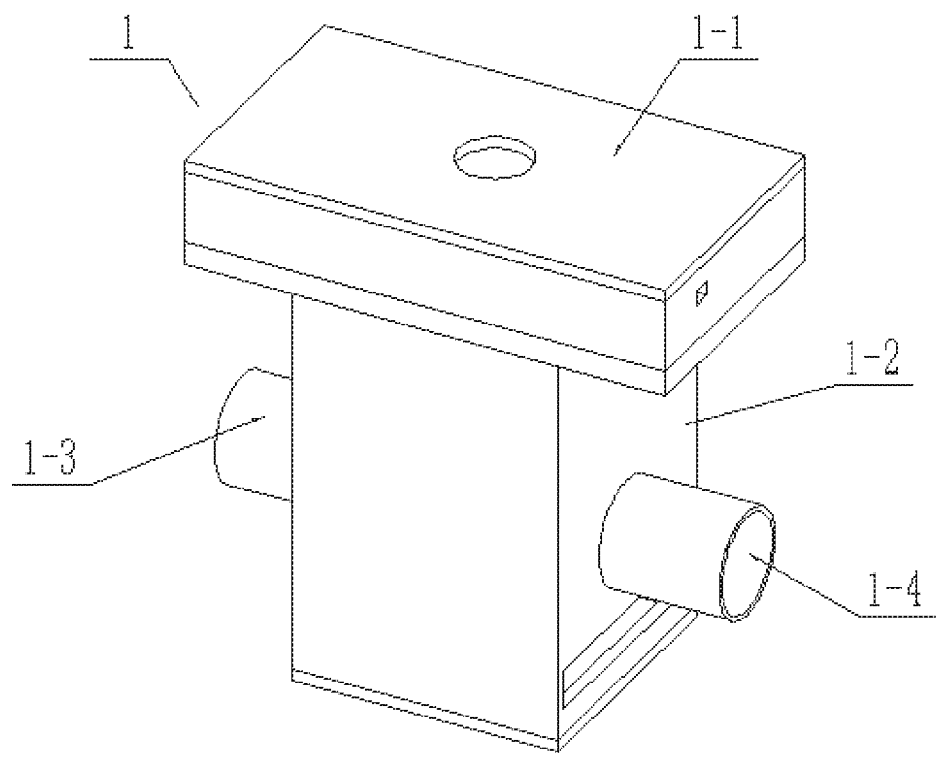
FIG. 4 is a schematic structural diagram of an internal valve body of the present invention.
Figure 5:
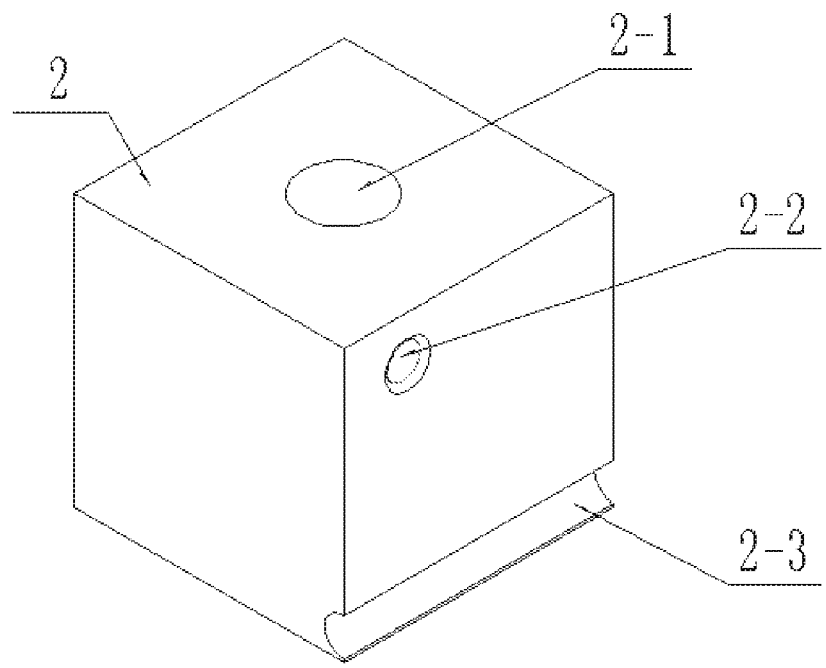
FIG. 5 is a schematic structural view of an internal valve element of the present invention.
Figure 6:
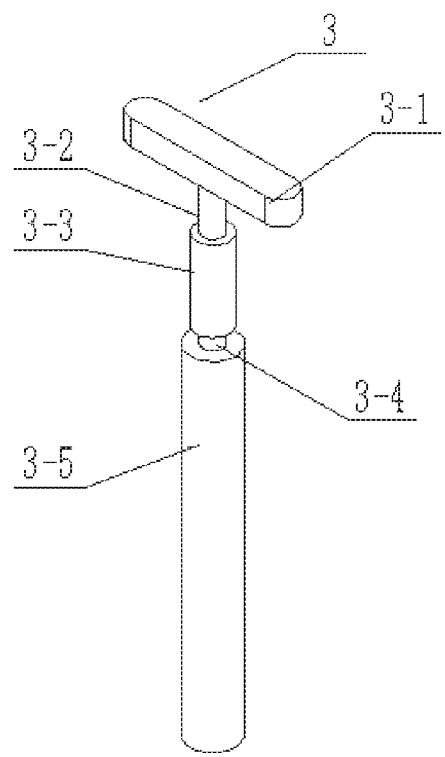
FIG. 6 is a schematic structural view of an internal valve control assembly of the present invention.
Figure 7:
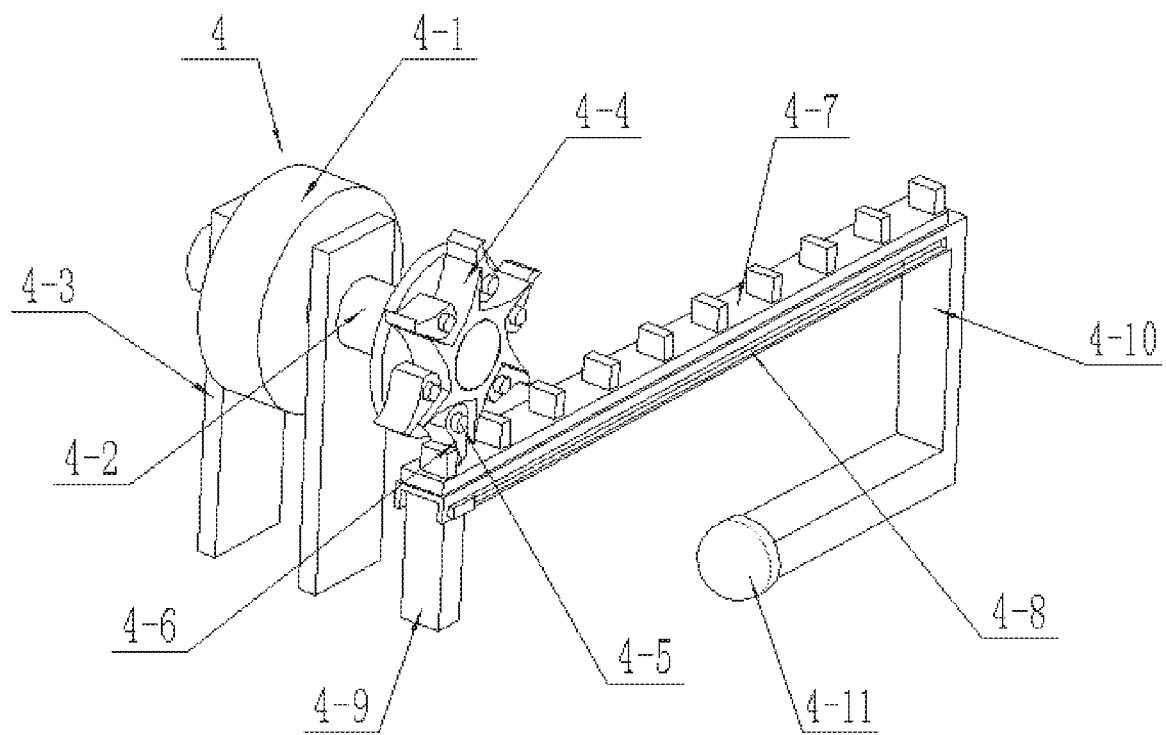
FIG. 7 is a schematic structural view of an internal locking assembly of the present invention.
Figure 8:
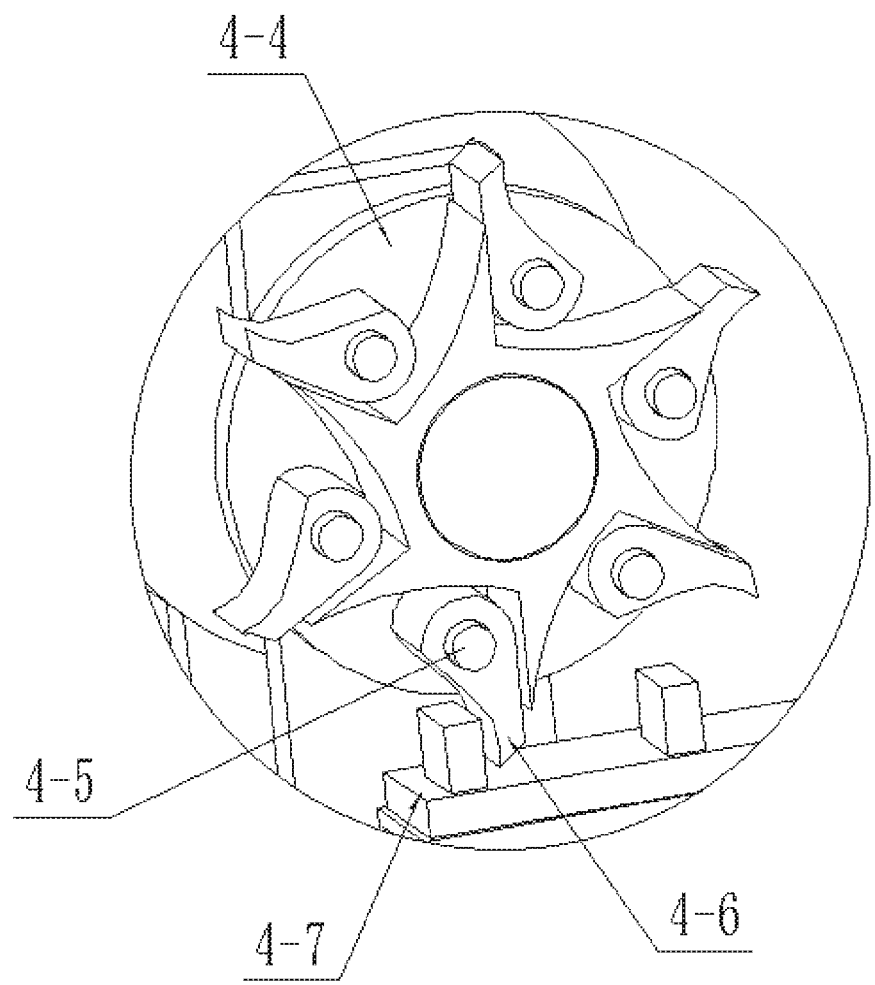
FIG. 8 is a partial enlarged schematic structural view of an internal locking assembly of the present invention.
Figure 9:
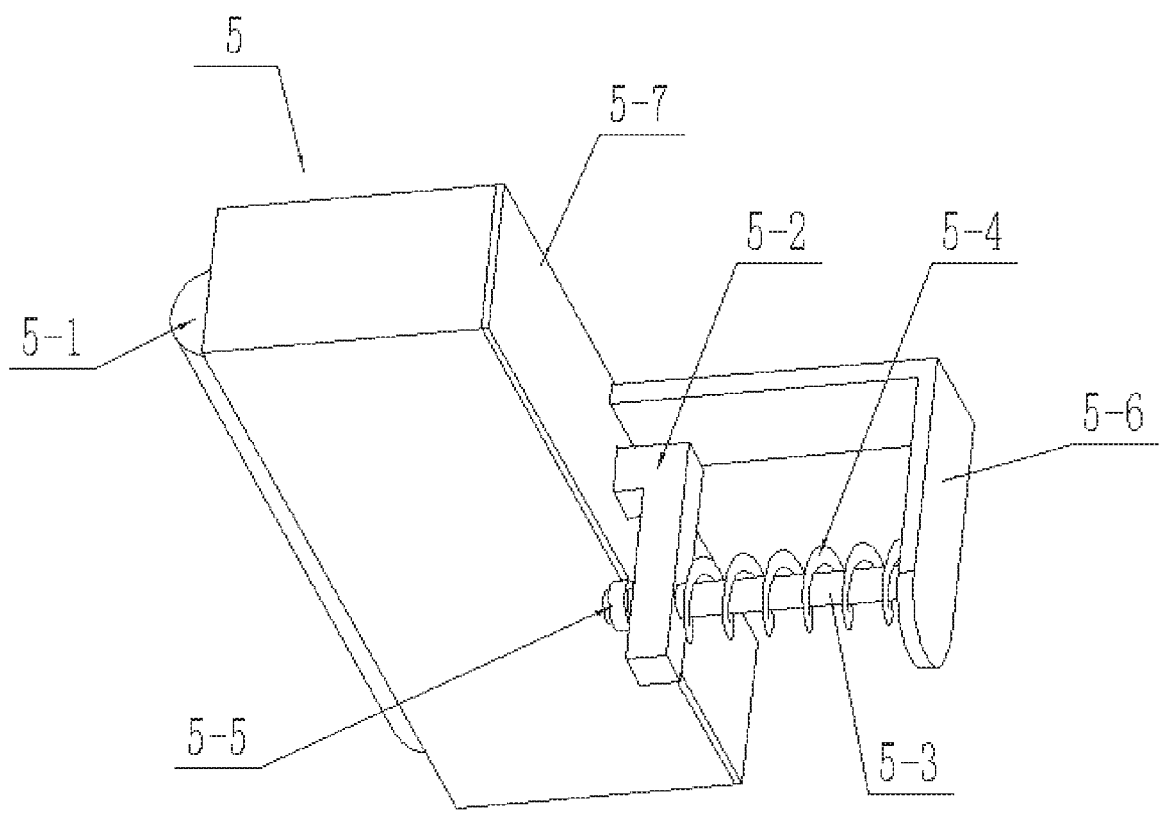
FIG. 9 is a schematic structural diagram of an internal lower locking assembly of the present invention.

The present invention is described in further detail below with reference to FIGS. 1-9.

Specific Implementation Mode 1:

As shown in FIGS. 1-9, the valve with the self-locking function comprises a valve body 1, a valve element 2, a valve control assembly 3 and an upper locking assembly 4 and a lower locking assembly 5 and is characterized in that the valve body 1 comprises an upper box body 1-1, a lower box body 1-2, a water inlet pipe 1-3 and a water outlet pipe 1-4; the lower end of the upper box body 1-1 is fixedly connected with and communicated with the lower box body 1-2, the left end of the lower box body 1-2 is fixedly connected with and communicated with a water inlet pipe 1-3, and the right end of the lower box body 1-2 is fixedly connected with and communicated with a water outlet pipe 1-4. The invention aims to provide a valve with a self-locking function and can effectively solve the problem in the prior art. During use, the valve control assembly 3 is used for controlling the position of the valve element 2, so that the valve body 1 is in an opened or closed state. An upper locking component 4 is arranged in the invention, when workers rotate the valve control assembly 3 to drive the valve element 2 to move upwards, the valve body 1 is in an open state, when liquid is conveyed by the water inlet pipe 1-3, the lower box body 1-2 and the water outlet pipe 1-4, the upper locking assembly 4 is used for synchronously jacking and locking the valve element 2 which can prevent maloperation closing of workers, when the upper locking assembly 4 needs to be unlocked, and the valve control assembly 3 is reversely rotated and synchronously pulls the upper locking assembly 4 to the right side. A lower locking assembly 5 is arranged in the invention, when workers rotate the valve control assembly 3 to drive the valve element 2 to move downwards, the valve body 1 is in a close state, when liquid cannot be conveyed by the water inlet pipe 1-3, the lower box body 1-2 and the water outlet pipe 1-4, the lower locking assembly 5 is used for synchronously jacking and locking valve element 2 which can prevent maloperation opening of workers, when the locking assembly 5 needs to be unlocked, the lower locking assembly 5 can be pulled towards the right side.

The valve element 2 is connected to the inner side of the upper box body 1-1 and the inner side of the lower box body 1-2 in a clearance fit mode; the valve element 2 is connected to the lower end of the valve control assembly 3 through threads; the valve control assembly 3 is connected to the top surface of the upper box body 1-1 in a rotating fit mode; the upper end of the upper locking assembly 4 is fixedly connected to the top surface of the upper box body 1-1, and the valve control assembly 3 is in transmission connection with the upper locking assembly 4; the upper locking assembly 4 is connected to the right side of the upper box body 1-1 in a sliding fit mode; the lower locking assembly 5 is fixedly connected to the lower box body 1-2 and the lower locking assembly 5 is communicated with the lower box body 1-2.

The valve element 2 is a rectangular core body; an inner threaded through hole 2-1 is formed in the middle of the valve element 2, an upper positioning inserting groove 2-2 is formed in the upper end of the right side face of the valve element 2, a lower positioning inserting groove 2-3 is formed in the lower end of the right side face of the valve element 2.

Specific Implementation Mode 2:

As shown in FIGS. 1-9, the valve control assembly 3 comprises a screwing rod 3-1, an upper short shaft 3-2, a worm 3-3, a lower short shaft 3-4 and an external thread control rod 3-5; the screwing rod 3-1, the upper short shaft 3-2, the worm 3-3, the lower short shaft 3-4 and the external thread control rod 3-5 are sequentially and fixedly connected from top to bottom; the worm 3-3 is in transmission connection with an upper locking assembly 4 and a lower short shaft 3-4 is rotationally connected to the top surface of the upper box body 1-1 through a belt seat bearing; the outer thread control rod 3-5 is rotationally matched with the inner side of the upper box body 1-1 and the inner side of the lower box body 1-2, and the outer thread control rod 3-5 is rotationally connected to the bottom surface of the lower box body 1-2 through a belt seat bearing; the outer thread control rod 3-5 is in threaded connection with the inner threaded through hole 2-1 of the valve element 2. During use of the valve control assembly 3, when the screwing rod 3-1 is rotated anticlockwise, the screwing rod 3-1 drives the upper short shaft 3-2, the worm 3-3, the lower short shaft 3-4 and the external thread control rod 3-5 rotate anticlockwise, the outer thread control rod 3-5 drives the valve element 2 to move upwards, so that the water inlet pipe 1-3 is blocked by the valve element 2, the lower box body 1-2 and the water outlet pipe 1-4 can convey liquid, the invention is in an opened state. When the outer thread control rod 3-5 drives the valve element 2 to move upwards to the top end and drives the upper locking assembly 4 to move when the worm 3-3 rotates, so that the upper locking assembly 4 abuts against the inner side of the upper positioning insertion groove 2-2, so that the locking and positioning after opening is realized. Otherwise, when the screwing rod 3-1 is rotated clockwise, and the screwing rod 3-1 drives the upper short shaft 3-2, the worm 3-3, the lower short shaft 3-4 and the external thread control rod 3-5 rotate clockwise, the outer thread control rod 3-5 drives the valve element 2 to move downwards, the valve element 2 is blocked in the water inlet pipe 1-3, the lower box body 1-2 and the water outlet pipe 1-4, so that the liquid cannot be conveyed, the invention is in a closed state. when the outer thread control rod 3-5 drives the valve element 2 to move downwards to the bottom end, the lower locking assembly 5 abuts against the inner side of the lower positioning insertion groove 2-3 under the action of elasticity, so that locking and positioning after closing can be realized, and maloperation of workers can be prevented.

Specific Implementation Mode 3:

As shown in FIGS. 1-9, the upper locking assembly 4 comprises a worm wheel 4-1, a wheel shaft 4-2 and a shaft frame plate 4-3, a one-way transmission wheel 4-4, a short column 4-5, a clamping jaw 4-6, a rack 4-7, a sliding chute frame 4-8, a T-shaped sliding block 4-9, an L-shaped push rod 4-10 and an upper locking top block 4-11; the worm wheel 4-1 is in threaded connection with a worm 3-3, a worm wheel 4-1 is fixedly connected to a wheel shaft 4-2, a wheel shaft 4-2 is rotationally connected to the shaft frame plate 4-3 through a belt seat bearing; the shaft frame plate 4-3 is fixedly connected to the top surface of the upper box body 1-1, the front end of the wheel shaft 4-2 is fixedly connected with a one-way transmission wheel 4-4, and a plurality of arc-shaped grooves are formed in the one-way transmission wheel 4-4, the rear end of the inner side of the arc-shaped groove is rotationally matched with a short column 4-5, the short column 4-5 is fixedly connected with a clamping jaw 4-6, the lower end of the clamping jaw 4-6 is connected to the rack 4-7 in a meshed mode, the rack 4-7 is fixedly connected to sliding chute frame 4-8, side sliding chute is formed in the side face of the sliding chute frame 4-8, lower sliding chute is formed in bottom surface of sliding chute frame 4-8, lower sliding chute communicated with side sliding chute; upper end of the T-shaped sliding block 4-9 is slidably connected to the inner sides of the lower sliding groove and the two side sliding grooves, the lower end of the T-shaped sliding block 4-9 is fixedly connected to the top surface of the upper box body 1-1, vertical rod of L-shaped push rod 4-10 fixedly connected with the right end of sliding chute frame 4-8, cross rod of the L-shaped push rod 4-10 is connected to the right side face of the upper box body 1-1 in a sliding fit mode, upper locking top block 4-11 is fixedly connected to the left end of L-shaped push rod 4-10, the upper locking top block 4-11 is arranged on the inner side of the upper box body 1-1. During use of the upper locking assembly 4, when the screwing rod 3-1 drives the worm 3-3 to rotate anticlockwise, the worm 3-3 drives the worm gear 4-1 to rotate clockwise, the worm gear 4-1 drives the one-way transmission wheel 4-4 to rotate clockwise through the wheel shaft 4-2, when the one-way transmission wheel 4-4 clockwise rotates, the rack 4-7 is driven to move towards the left side by driving the clamping jaw 4-6, the rack 4-7 drives the L-shaped push rod 4-10 and the upper locking top block 4-11 to move to the left side, so that an upper locking top block 4-11 abuts against the inner side of the upper positioning insertion groove 2-2 to realize locking after the opening is opened; when unlocking is needed, the screwing rod 3-1 needs to be reversely screwed, and finally drives the one-way transmission wheel 4-4 to rotate anticlockwise, when the one-way transmission wheel 4-4 rotates anticlockwise, the clamping jaws 4-6 naturally fall off the teeth on the racks 4-7 under the action of gravity, so that the l-shaped push rods 4-10 can be pulled to drive the racks 4-7 to move towards the right side, and the upper locking top block 4-11 is separated from the upper positioning insertion groove 2-2.

The upper locking top block 4-11 is in clearance fit with the inner side of the upper positioning insertion groove 2-2.

Specific Implementation Mode 4:

As shown in FIGS. 1-9, the lower locking assembly 5 comprises a lower locking top block 5-1, a L-shaped push-pull rod 5-2, a spring rod 5-3 and an extension spring 5-4, a limiting ring 5-5, an L-shaped seat plate 5-6 and a left side hollow sliding box 5-7; the left end of the sliding box 5-7 is fixedly connected to the lower end of the right side surface of the lower box body 1-2, the sliding box 5-7 communicated with the lower box body 1-2, the lower locking top block 5-1 is slidably fitted in the sliding box 5-7, the right end of the lower locking top block 5-1 is fixedly connected with a L-shaped push-pull rod 5-2, cross rod of the L-shaped push-pull rod 5-2 is connected to the sliding 10 box 5-7 in a sliding fit mode, vertical rod of L-shaped push-pull rod 5-2 is arranged at the right end of sliding box 5-7, the L-shaped seat plate 5-6 is fixedly connected to the right end of the sliding box 5-7, the left end of the spring rod 5-3 is in sliding fit connection with a vertical rod of an L-shaped push-pull rod 5-2, the right end of the spring rod 5-3 is fixedly connected to the L-shaped seat plate 5-6, the spring rod 5-3 is sleeved with the extension spring 5-4, and the left end and the right end of the extension spring 5-4 are fixedly connected to the L-shaped push-pull rod 5-2 and the L-shaped seat plate 5-6 respectively, the left end of the spring rod 5-3 is connected with a limiting ring 5-5 through threads, the right side surface of the limiting ring 5-5 is attached to the left side surface of the vertical rod of the L-shaped push-pull rod 5-2. During use of the lower locking assembly, when the screwing rod 3-1 drives the external thread control rod 3-5 to rotate clockwise, the outer thread control rod 3-5 drives the valve element 2 to move downwards, the valve element 2 is blocked in the water inlet pipe 1-3, lower box body 1-2 and the water outlet pipe 1-4, so that the liquid cannot be conveyed, the invention is in a closed state, when the outer thread control rod 3-5 drives the valve element 2 to move downwards to the bottom end, the lower locking top block 5-1 inside the lower locking assembly 5 abuts against the inner side of the lower positioning insertion groove 2-3 under the action of the elasticity of the extension spring 5-4, so that the locking and positioning after being closed can be realized, and maloperation of workers can be prevented. when unlocking is needed, the L-shaped seat plate 5-6 is pulled to the right side, so that the lower locking top block 5-1 is separated from the lower positioning insertion groove 2-3, at the moment, the extension spring 5-4 is in a stretching state.

The lower locking top block 5-1 is in clearance fit with the inner side of the lower positioning insertion groove 2-3.

The working principle of the invention is as follows:

During use, the valve control assembly 3 is used for controlling the position of the valve element 2, so that the valve body 1 is in an opened or closed state. An upper locking component 4 is arranged in the invention, when workers rotate the valve control assembly 3 to drive the valve element 2 to move upwards, the valve body 1 is in an open state, when liquid is conveyed by the water inlet pipe 1-3, the lower box body 1-2 and the water outlet pipe 1-4, the upper locking assembly 4 is used for synchronously jacking and 11 locking the valve element 2 which can prevent maloperation closing of workers, when the upper locking assembly 4 needs to be unlocked, and the valve control assembly 3 is reversely rotated and synchronously pulls the upper locking assembly 4 to the right side. A lower locking assembly 5 is arranged in the invention, when workers rotate the valve control assembly 3 to drive the valve element 2 to move downwards, the valve body 1 is in a close state, when liquid cannot be conveyed by the water inlet pipe 1-3, the lower box body 1-2 and the water outlet pipe 1-4, the lower locking assembly 5 is used for synchronously jacking and locking valve element 2 which can prevent maloperation opening of workers, when the locking assembly 5 needs to be unlocked, the lower locking assembly 5 can be pulled towards the right side. During use of the valve control assembly 3, when the screwing rod 3-1 is rotated anticlockwise, the screwing rod 3-1 drives the upper short shaft 3-2, the worm 3-3, the lower short shaft 3-4 and the external thread control rod 3-5 rotate anticlockwise, the outer thread control rod 3-5 drives the valve element 2 to move upwards, so that the water inlet pipe 1-3 is blocked by the valve element 2, the lower box body 1-2 and the water outlet pipe 1-4 can convey liquid, the invention is in an opened state. When the outer thread control rod 3-5 drives the valve element 2 to move upwards to the top end and drives the upper locking assembly 4 to move when the worm 3-3 rotates, so that the upper locking assembly 4 abuts against the inner side of the upper positioning insertion groove 2-2, so that the locking and positioning after opening is realized. Otherwise, when the screwing rod 3-1 is rotated clockwise, and the screwing rod 3-1 drives the upper short shaft 3-2, the worm 3-3, the lower short shaft 3-4 and the external thread control rod 3-5 rotate clockwise, the outer thread control rod 3-5 drives the valve element 2 to move downwards, the valve element 2 is blocked in the water inlet pipe 1-3, the lower box body 1-2 and the water outlet pipe 1-4, so that the liquid cannot be conveyed, the invention is in a closed state. when the outer thread control rod 3-5 drives the valve element 2 to move downwards to the bottom end, the lower locking assembly 5 abuts against the inner side of the lower positioning insertion groove 2-3 under the action of elasticity, so that locking and positioning after closing can be realized, and maloperation of workers can be prevented. During use of the upper locking assembly 4, when the screwing rod 3-1 drives the worm 3-3 to rotate anticlockwise, the worm 3-3 drives the worm gear 4-1 to rotate clockwise, the worm gear 12 4-1 drives the one-way transmission wheel 4-4 to rotate clockwise through the wheel shaft 4-2, when the one-way transmission wheel 4-4 clockwise rotates, the rack 4-7 is driven to move towards the left side by driving the clamping jaw 4-6, the rack 4-7 drives the L-shaped push rod 4-10 and the upper locking top block 4-11 to move to the left side, so that an upper locking top block 4-11 abuts against the inner side of the upper positioning insertion groove 2-2 to realize locking after the opening is opened; when unlocking is needed, the screwing rod 3-1 needs to be reversely screwed, and finally drives the one-way transmission wheel 4-4 to rotate anticlockwise, when the one-way transmission wheel 4-4 rotates anticlockwise, the clamping jaws 4-6 naturally fall off the teeth on the racks 4-7 under the action of gravity, so that the l-shaped push rods 4-10 can be pulled to drive the racks 4-7 to move towards the right side, and the upper locking top block 4-11 is separated from the upper positioning insertion groove 2-2. During use of the lower locking assembly, when the screwing rod 3-1 drives the external control rod 3-5 to rotate clockwise, the outer thread control rod 3-5 drives the valve element 2 to move downwards, the valve element 2 is blocked in the water inlet pipe 1-3, lower box body 1-2 and the water outlet pipe 1-4, so that the liquid cannot be conveyed, the invention is in a closed state, when the outer thread control rod 3-5 drives the valve element 2 to move downwards to the bottom end, the lower locking top block 5-1 inside the lower locking assembly 5 abuts against the inner side of the lower positioning insertion groove 2-3 under the action of the elasticity of the extension spring 5-4, so that the locking and positioning after being closed can be realized, and maloperation of workers can be prevented. when unlocking is needed, the L-shaped seat plate 5-6 is pulled to the right side, so that the lower locking top block 5-1 is separated from the lower positioning insertion groove 2-3, at the moment, the extension spring 5-4 is in a stretching state.

Definitely, the above description is not a limitation of the present invention and is not limited to the above examples. Variations, modifications, additions, or substitutions made within the essential scope of the invention by general technicians in the field of operation are also belong to the protection scope of the invention.

The invention claimed is:

1. A self-locking valve, comprising:
a valve body, comprising:
an upper box body;
a lower box body coupled to and in communication with a lower end of the upper box body;
a water inlet pipe coupled to and in communication with a left end of the lower box body; and
a water outlet pipe coupled to and in communication with a right end of the lower box body;
a valve element slidingly coupled within the upper box body and the lower box body, the valve element comprising:
a rectangular core body;
a threaded through hole through the rectangular core body along a longitudinal axis thereof, the threaded through hole extending from a top surface thereof to a bottom surface thereof;
an upper positioning inserting groove in a right side face of the rectangular core body proximate the top surface thereof; and
a lower positioning inserting groove in the right side face of the rectangular core body proximate the bottom surface thereof a valve control assembly, extending through an aperture through a top surface of the upper box body and rotatably coupled to a lower surface of the lower box body, wherein
the valve control assembly is rotatable with respect to the valve body, the valve control assembly comprising:
a screwing rod configured for a user to rotate the valve control assembly by rotating the screwing rod;
a threaded control rod corresponding to and threaded through the threaded through hole of the valve element, wherein the valve element slides relative to the valve body in response to rotation of the valve control assembly; and
a worm gear coupled to and concentric with the valve control assembly, the worm gear being disposed exterior to the valve body;
an upper locking assembly coupled to the top surface of the upper box body and operationally coupled to the worm gear of the valve control assembly, wherein the upper locking assembly slidingly engages a right side of the upper box body in response to rotation of the valve control assembly in a first direction to stop further rotation of the valve control assembly in the first direction and disengages the right side of the upper box body in response to rotation of the valve control assembly in a second direction; and
a lower locking assembly coupled to and in communication with the lower box body.

2. The self-locking valve of claim 1, wherein the upper locking assembly comprises:
a shaft frame plate coupled to the top surface of the upper box body;
a wheel shaft rotationally coupled to and supported by the shaft frame plate;
a worm wheel coupled to the wheel shaft, wherein the worm wheel corresponds to and engages the worm gear of the valve control assembly;
a one-way transmission wheel coupled to the wheel shaft, the one-way transmission wheel comprising:
a plurality of arc-shaped grooves spaced evenly around a circumference thereof;
a plurality of short columns protruding therefrom, each of the plurality of short columns corresponding to and disposed within one of the plurality of arc-shaped grooves, wherein each of the plurality of short columns is parallel to the wheel shaft;
a plurality of clamping jaws, each of the plurality of clamping jaws corresponding to and rotationally coupled to one of the plurality of short columns;
a T-shaped sliding block coupled to the surface of the upper box body;
a sliding chute frame slidingly coupled to the T-shaped sliding block;
a rack coupled to the sliding chute frame, wherein the rack has a plurality of teeth coupled thereto that engage the plurality of clamping jaws, wherein each of the plurality of clamping jaws is configured to engage the teeth of the rack when the valve control assembly is rotated in a first direction, wherein the sliding chute frame slides in a first direction relative to the T-shaped sliding block, and, when the valve control assembly is rotated in a second direction, the clamping jaws rotate to a disengaged configuration relative to the arc-shaped grooves to which they correspond such that the clamping jaws do not engage the teeth of the rack;
an L-shaped push rod comprising:
a first leg, wherein a first end of the first leg is coupled to an end of the rack, the first leg extending perpendicularly from the rack; and
a second leg coupled to a second end of the first leg and extending perpendicularly therefrom, the rack and L-shaped push rod assembly forming a U-shape, wherein the second leg extends through a side aperture through the upper box body, wherein the second leg is configured to slide inward and outward relative to the upper box body through the side aperture; and
an upper locking top block coupled to an end of the second leg opposite the first leg, wherein the upper locking top block is disposed within an inner volume of the upper box body.

3. The self-locking valve of claim 2, wherein the upper locking top block is configured to engage the upper positioning insertion groove of the valve element, wherein the upper locking top block may be partially inserted into the upper positioning insertion groove in response to rotation of the valve control assembly in a first direction when the upper positioning insertion groove is aligned with the upper locking top block.

4. The self-locking valve of claim 3, wherein the lower locking assembly comprises:
a sliding box coupled to and in communication with the lower box body proximate the lower surface of the lower box body;
an L-shaped seat plate coupled to the sliding box, wherein a first end of a first leg of the L-shaped seat plate is coupled to and extends outwardly from the sliding box;
a spring rod coupled to a second leg of the L-shaped seat plate and extending inwardly therefrom;
a limiting ring coupled to an end of the spring rod opposite the second leg of the L-shaped seat plate;
an L-shaped push-pull rod slidingly coupled to the spring rod, wherein a first leg of the L-shaped push-pull rod has an aperture therethrough through which the spring rod extends, such that the first leg of the L-shaped push-pull rod is free to slide along the spring rod between the second leg of the L-shaped seat plate and the limiting ring, wherein a second leg of the L-shaped push-pull rod extends slidingly through an aperture through a side of the sliding box;
an extension spring coupled around the spring rod between the second leg of the L-shaped seat plate and the first leg of the L-shaped push-pull rod, wherein the extension spring biases the L-shaped push-pull rod toward the limiting ring;

a lower locking top block coupled to an end of the first leg of the L-shaped push-pull rod opposite the second leg of the L-shaped push-pull rod, the lower locking top block being slidingly coupled within the sliding box, wherein the lower locking top block is disposed within an inner volume of the sliding box.

5. The self-locking valve of claim 4, wherein the lower locking top block is configured to engage the lower positioning insertion groove of the valve element, wherein the lower locking top block may be partially inserted into the lower positioning insertion groove when the lower positioning insertion groove is in alignment with the lower locking top block in response to a force of the extension spring acting on the L-shaped push-pull rod.

\* \* \* \* \*